United States Patent Office 2,715,638
Patented Aug. 16, 1955

2,715,638

PRODUCTION OF STEROLS FROM TALL OIL PITCH

Hans Albrecht, Stamford, Conn., and Richard Herrlinger, Roselle Park, N. J., assignors to American Cyanamid Company, New York, N. Y., a corporation of Maine No Drawing. Application July 28, 1953,
Serial No. 370,853

10 Claims. (Cl. 260—397.25)

The present invention relates to improved methods of recovering sterols in relatively pure form from tall oil pitch and, more particularly concerns the production of beta-sitosterol from such a source.

Sterols are solid, crystalline, alcoholic substances of biological importance found in the non-saponifiable matter of plants and animals. They are complex cyclic compounds containing 27–30 carbon atoms and are characterized structurally by the presence of a phenanthrene ring system having an additional, fused five-membered ring and are more technically termed hydroxylated perhydro-1,2-cycle pentenophenanthrene derivatives.

Sterols derived from animal origin have, until recently, been used in the production of male and female and cortical hormones and were substantially the main source material therefor. However, during the last decade, it was discovered that less expensive and more readily available vegetable or plant steroids, such as diosgenin and stigmasterol, provide more practicable starting materials for the synthesis of these hormones. Beta-sitosterol, for example, the principal steroid of the pine tree, can also be used for this purpose, but inasmuch as the synthesis is somewhat more complex than that employing stigmasterol, for example, it has not been accepted by the industry due to the economic disadvantages involved in the use of the more complex procedures.

It is therefore a principal object of the present invention to provide relatively inexpensive methods of producing sterols including beta-sitosterol whereby such a material, due to its resulting inexpensive nature, can compete with other sterols, in spite of its more complex processing.

Sitosterols, or mixtures thereof, are found in nature and are the most widely distributed of plant sterols, although individual sitosterols are isolated only with difficulty. Generally, beta-sitosterol ($C_{29}H_{49}OH$) is the most common and the most important of the sitosterols, although it is frequently accompanied by its isomers. Beta-sitosterol has been isolated from corn oil, wheat germ oil, cottonseed oil, rye germ oil, sarsaparilla root, and a number of other plant sources but none of these provides a readily available source for the pure sterol. It is also known to be one of the major constituents of the commercially available sterols of soya bean oil but is a part therein of a very complex mixture containing many known and unknown sterols and its recovery is thus very difficult. Consequently, such sources thus far have not proved to be the answer to the problem involving the use of beta-sitosterol.

It is therefore another principal object of the present invention to provide an adequate source of and a simple and relatively uncomplicated method of recovery of sterols, particularly beta-sitosterol, in relatively pure form.

Beta-sitosterol has been isolated from the unsaponifiable portion of tall oil and such a source has been indicated to be a much more promising source than those previously mentioned. Investigations of such recovery methods, however, have left much to be desired. Extraction of the unsaponifiables from sulfate soap is made quite diffcult by the ready formation of emulsion. Solvent extractions have proved of dubious commercial value due to the relative cost or scarcity of such solvents and to the intensive purification required to produce a pure product. Esterification processes have been attempted but the inclusion of contaminants has militated against the use of such processes.

It is, therefore, still another principal object of the present invention to provide practicable and commercially acceptable methods of recovering sterols, particularly beta-sitosterols, from relatively inexpensive and available sources.

In a co-pending case, Serial No. 370,854, filed July 28, 1953, there are shown methods of attaining such objects and producing materials which contain 72–75% or more sterols. Such a product is excellent and fulfills many needs and requirements now existing in the industry. However, when a purer product is desired, improved processes are in order.

It is, therefore, a further principal object of the present invention to provide simple and relatively inexpensive methods of recovering sterols in relatively pure form.

We have discovered that such objects may be accomplished and that crude sterols of higher sterol content and greater purity may be produced from tall oil pitch by initially neutralizing the free rosin and fatty acids in the pitch by using a limited amount of a neutralizing agent, separating and discarding the neutralized acids which form a distinct lower layer in the reaction mixture, and then saponifying the remaining upper layer containing the sterol esters with an alcoholic potassium hydroxide solution. The saponified reaction mixture may then be diluted with hot water, filtered and permitted to cool, preferably to room temperature (20–25° C.), whereby the sterols precipitate out of solution. The precipitate may then be separated, such as by filtering, and then washed and dried.

The predominant sterol present in the crude sterol material has been isolated and has been identified as beta-sitosterol, the properties of which are listed herewith:

Melting point _____ 138–140° C.
Optical rotation $[\alpha]_D^{25}$ _____ —36°
Melting point of derivatives:
    Acetate _____ 128–129° C.
    Benzoate _____ 146–147° C.
    3,5-dinitrobenzoate _____ 202–203° C.

It has been determined that the crude sterols as produced by the methods of this invention contain 80–38% or more sterols (digitonin) and that the largest single constituent is beta-sitosterol which is present in amounts normally greater than 70%. Consequently, it can be seen that such processes involving tall oil pitch, a relatively inexpensive source material, provide an excellent source of sterols and particularly beta-sitosterol.

The source material for such sterols is tall oil pitch which is the residue in the fractionation of tall oil and, although a widely varying composition, in general, possesses the following estimated percentages of constituents:

|   | Percent |
|---|---|
| Unsaponifiables | 32 |
| Rosin acids (free) | 22 |
| Rosin acids (esterified) | 8 |
| Fatty acids (free) | 6 |
| Fatty acids (esterified) | 23 |
| "Lignous" acids | 9 |
|   | 100 |

The unsaponifiables normally consist of approximately 45% sitosterols, 15% aliphatic alcohols (mainly lignoceryl alcohol $C_{24}H_{49}OH$), and undetermined amounts of other hydroxy compounds and hydrocarbons.

A typical analysis of one particular sample of tall oil pitch showed the following specifications:

| | |
|---|---|
| Acid No. | 59.2 |
| Saponification No. | 117.8 |
| Iodine No. | 115.5 |

The invention will be further illustrated in greater detail by the following specific examples. It should be understood, however, that although these examples may describe in particular detail some of the more specific features of the present invention, they are given primarily for purposes of illustration and the invention in its broader aspects is not to be construed as limited thereto.

*Example 1*

1000 grams of tall oil pitch, 100 grams of sodium hydroxide (97%) and 1000 grams of water were charged to a three-necked flask equipped with an agitator, reflux condenser and heating mantle, and heated to the boiling point with agitation and then refluxed for an additional 15 minutes. 3000 grams of water at 95° C. was added and the reaction mixture heated and refluxed for an additional 45 minutes. The agitator was then shut off and the reaction mixture allowed to cool to 90–95° C. This cooling period required approximately 30 minutes. The lower soap layer was then drawn off and discarded and the upper pitch oil layer (saponification number=91) which consisted largely of sterol esters which had not been appreciably saponified by the sodium hydroxide was separated and held. This upper layer will be sometimes referred to hereinafter as "pitch oil."

1000 grams (1050 cc.) of pitch oil (collected from several batches) and 500 grams (640 cc.) of isopropanol were charged to a three-necked flask and heated to at least 75° C. and 180 grams of potassium hydroxide (Tech. 85%) added with the agitator in operation. The reaction mixture was heated to boiling and then refluxed for 1.5 hours. 2000 grams of water and 20 grams of carbon were then added at a temperature preferably below 60° C. The mixture was then heated to 80° C. and filtered through a preheated filter. The filter cake was washed with a mixture of 30 grams of isopropanol and 60 grams of water and the filtrate was allowed to cool slowly to room temperature (20–25° F.) without external cooling and with either very slow or no agitation. The crystallization of the sterols which precipitated out required about 20 hours. The sterol crystals were then filtered off and the filter cake washed with a mixture of 70 grams of isopropanol and 280 grams of water. The filter was then heated to 70° C. and the filter cake was washed with a mixture of 70 grams of isopropanol and 280 grams of water prewarmed to 70° C. and then with 150 grams of water prewarmed to 70° C. The sterol filter cake was then dried in an oven at 50–60° C. The resulting material, 96 grams (9.6% yield based on the pitch), was a white crystalline product which contained 83% sterols (digitonin method), had a melting point of 120–125° C.; 0.5% ash and, when dissolved in chloroform, yielded a not entirely clear solution.

*Example 2*

The procedures set forth in Example 1 were followed on a larger scale. 100 pounds of tall oil pitch, 10 pounds of sodium hydroxide (97%) and 100 pounds of water were used in the first stage neutralization treatment which took place in a closed steam-jacketed kettle equipped with an agitator and a reflux condenser. 200 pounds of water were used for the dilution step and the remainder of the procedures were as described previously in Example 1.

*Example 3*

818 grams (1 part) of tall oil pitch was refluxed with a mixture of 82 grams of sodium hydroxide (Tech.) in 1023 ml. (1.25 parts) of water for 15 minutes. 2250 ml. (2.75 parts) of water were then added and the reaction mixture heated and refluxed for an additional 40 minutes. The pitch oil was allowed to settle and was separated. The saponification number of the oil was 82.4 and the yield was 36.8%.

200 g. (1 part) of pitch oil were dissolved in 100 g. (0.5 part) of isopropanol, and then 36 g. of technical potassium hydroxide was added and the mixture refluxed for 1 hour. To the hot solution was added 400 g. (2 parts) of hot water and 2 g. of carbon and the hot solution was thoroughly mixed and filtered. The filtrate was allowed to cool to room temperature (25° C.) and the precipitate separated by filtration. The filter cake was washed with 140 ml. (0.7 part) of a mixture of one part of isopropanol and 2 parts of water and finally with 60 ml. of water. The dried filter cake was 51.6 g. (25.8% as based on the pitch oil) and had a very faint yellow color.

*Example 4*

The procedures set forth in Example 3 were followed except that the saponification solvent comprised a mixture of 100 ml. of isopropanol and 14 g. of water (azeotropic mixture of isopropanol and water). This is of considerable commercial importance inasmuch as the isopropanol recovered from the process would be in that form. The example shows that a satisfactory yield can be obtained using the recovered alcohol-water mixture. Another change was the warming of the filter cake to 70° C. after the isopropanol-water wash and the washing with 100 ml. of a mixture of isopropanol-water at 70° C. and 50 ml. of water at 70° C. The dried filter cake was 42 g. (21%) and had a white-gray color.

*Example 5*

814 pounds of tall oil pitch at 70–75° C. was mixed with a solution of 81.4 pounds of technical sodium hydroxide (97%) in 814 pounds of water also at 70–75° C. 2450 pounds of hot water was added and the materials were refluxed for 1 hour. The pitch oil which was then allowed to separate out of the reaction mixture was separated by decantation methods. The yield was 39.5% of pitch oil.

100 pounds of the pitch oil was mixed with 50 pounds of isopropanol and 6.3 pounds of water at 75° C. and agitated during the addition of 18 pounds of potassium hydroxide (Tech. 85%). The mixture was heated to boiling and refluxed for 1.5 hours. 200 pounds of hot water was then added, followed by the addition of 2 pounds of carbon, preferably at a temperature less than 75° C. The temperature of the solution was raised to 80° C. and then held thereat for 10 minutes, prior to filtering through a preheated, precoated filter. Add 30 pounds of isopropanol and 90 pounds of water to the filtrate and reheat with agitation to 80° C. before permitting the batch to cool with very gentle agitation to 40–45° C. and then with no agitation to 30° C.; the total crystallization time being 16–20 hours. Filter and wash with a mixture of 24 pounds of isopropanol and 96 pounds of water, the temperature of which is, at least, 28° C. The color of the filtrate from the wash was a very pale yellow. The filter was then heated to 70° C. and the filter cake was washed with a mixture of 10 pounds of isopropanol and 40 pounds of water prewarmed to 70° C. and then with 50 pounds of water also prewarmed to 70° C. The cake was dewatered and dried in an oven at 50–60° C.

*Example 6*

100 grams of tall oil pitch was refluxed with a mixture of 17 grams of technical grade sodium hydroxide in 250 ml. of water for 1.5 hours. The pitch oil was allowed to settle and was separated. The saponification number was 78.3.

20 grams (1 part) of the pitch oil was dissolved in 40 ml. (2 parts) of isopropanol and 3.7 grams of technical potassium hydroxide (88%) and the mixture was refluxed for 1 hour. 120 grams (6 parts) of hot water were added and the solution permitted to cool slowly to room temperature (20–25° C.). The resulting precipitate which crystallized out was filtered off and washed with 40 ml. (2 parts) of a mixture of 1 part of isopropanol and 4 parts of water, and then finally with 30 ml. of water. After drying at 70° C., a filter cake of 5.5 grams (27.5%) was obtained.

*Example 7*

154 grams (1 part) of tall oil pitch was refluxed with a mixture of 15.4 grams of sodium hydroxide (97%) in 750 ml. (4.9 parts) water for 2 hours. The pitch oil was allowed to settle and was separated. The saponification number was 80.0 and the yield of pitch oil was 39%.

100 grams (1 part) of the pitch oil was dissolved in 50 grams (0.5 part) of isopropanol and 18 grams of technical potassium hydroxide added. The materials were refluxed for 1 hour and 200 grams (2 parts) of hot water and 1 gram of carbon were added, mixed, and filtered through a "Filter-Cel" bed. The filtrate was allowed to cool to room temperature (25° C.) and the crystalline precipitate separated out. The filter cake was washed with 70 ml. (0.7 part) of a mixture of one part of isopropanol and 2 parts of water, and then finally washed with 30 ml. of water. The dried filter cake was 52.6 grams (26.3%) yield and had a faint yellow color.

The neutralizing agents employed in the preceding examples were dilute aqueous solutions of sodium hydroxide but it is to be pointed out that other equivalent materials are equally applicable within the scope of the present invention. Such other materials would include sodium carbonate, ammonium hydroxide, ammonium carbonate, lithium hydroxide, lithium carbonate, etc.

The amount of neutralizing agent should be enough to neutralize all of the acids present and there should be enough to provide for a good phase separation. The amount, however, should not be that great as to create the possibility of saponification of the sterol esters and, consequently, not too great an excess over that theoretically required is needed. It has been found that as low as 7% by weight of sodium hydroxide based on the amount of tall oil pitch is sufficient and that as high as about 17% by weight of sodium hydroxide may be used without interfering too seriously with the reaction or decreasing the yields markedly. The preferred range of sodium hydroxide would appear to be in the range 9–12% by weight.

In order to establish the total amount of water best suited for the neutralization of the tall oil pitch and the subsequent separation of the resulting pitch oil, the following tests were carried out in which 1 part of tall oil pitch and 0.1 part of sodium hydroxide were used.

PITCH OIL

| Parts of Water | Percent of Pitch | Sap. No. | Remarks |
| --- | --- | --- | --- |
| 1.25 | | | Too small an oil separation. |
| 2.00 | 28.0 | 74.6 | Good separation. |
| 3.00 | 32.5 | 90.8 | Do. |
| 5.00 | 29.0 | 80.0 | Do. |
| 10.00 | | | Very milky, slow separation. |

It was, therefore, determined that from about at least 2 parts up to about 7.5 parts of total water based on the amount of tall oil pitch was commercially acceptable in the neutralization step, with the preferred range lying between 2.5 and 5.0. It is preferred that any dilution water used after the neutralization should be added quickly so as to reduce the possibility of saponification of the sterol esters.

The alcohol employed in the preparation of the alcoholic potassium hydroxide solution which is used to saponify the pitch oil may be any water-soluble aliphatic monohydroxy alcohol having two or more carbon atoms. For the purposes of this invention, however, those alcohols having from two to six carbon atoms, such as ethanol, propanol, isopropanol, butanol, pentanol, hexanol, etc., are preferred.

The concentration of the potassium hydroxide used in the preparation of the alcoholic caustic pot ash solution is necessarily at least 2% and may be as high as 13%. The quantity of potassium hydroxide used should provide at least 20% in excess of the theoretical amount required to saponify the sterol esters. If the excess were less than 20%, then a slower reaction would take place resulting in less complete saponification and a much less acceptable commercial product. Theoretically, any excess of potassium hydroxide greater than 20% would be operative but the upper limits of such a range would be dictated by the economic factors involved. For the purposes of the present invention, however, a range of from about 60% to about 100% excess is preferable.

The dilution with hot water following the saponification of the sterol esters should be at a sufficiently high temperature above room temperature so that the solution will be able to slowly cool to 20–25° C. over a reasonable length of time to facilitate the formation of a crystalline precipitate with good filtering characteristics. The proportion of hot diluting water to soap solution is naturally within a critical range inasmuch as solubility, precipitation and crystallization factors are present. The ratio of water:reaction mixture may extend from about 2:1 to about 5:1 with the optimum proportion being approximately 3:1. If the amount of water is too small, then there will be an incomplete precipitation of the sterols, whereas if the amount of water is too great, the possibility of contamination with an oil material is created.

Upon a comparison of the product of the methods of this invention and the product resulting from solvent extraction of saponified tall oil pitch, it was established that the crystallized, precipitated sterols resulting from the procedures of this invention were much more readily purified than the solvent-extracted products.

Although we have described but a few specific examples of our invention, we consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

We claim:

1. The method of recovering sterols from tall oil pitch which comprises treating the tall oil pitch with a dilute aqueous solution of a member of the group consisting of the hydroxides and carbonates of sodium, ammonium and lithium in an amount sufficient to neutralize the free rosin and fatty acids in said tall oil pitch but not enough to saponify the sterol esters therein; separating the sterol esters from the reaction mixture; saponifying the sterol esters with an alcoholic potassium hydroxide solution comprising a water-soluble aliphatic monohydroxy alcohol and at least 20% excess potassium hydroxide with respect to the sterol esters; diluting the saponified sterol ester solution with hot water having a temperature of at least 40° C. but less than the boiling point of the solution, said hot water being added in a water:solution ratio of from 2:1 to about 5:1; gradually cooling the diluted solution whereby the sterols precipitate out; and separating the precipitated sterols from the cooled, diluted solution.

2. The method as defined in claim 1 wherein the tall oil pitch is treated with sodium hydroxide.

3. The method as defined in claim 1 wherein the tall oil pitch is treated with sodium hydroxide in amounts equal to from about 7% to about 17% of the weight of the tall oil pitch.

4. The method as defined in claim 1 wherein the tall oil pitch is treated with sodium hydroxide in amounts equal to from about 9% to about 12% of the weight of the tall oil pitch.

5. The method as defined in claim 1 wherein the water-soluble aliphatic monohydroxy alcohol contains from 2 to 6 carbon atoms.

6. The method as defined in claim 1 wherein the water-soluble aliphatic monohydroxy alcohol is isopropanol.

7. The method as defined in claim 1 wherein the alcohol used in preparing the potassium hydroxide solution comprises an azeotropic mixture of isopropanol and water.

8. The method as defined in claim 1 wherein the alcoholic solution contains from about 20% to about 100% excess potassium hydroxide with respect to the sterol esters.

9. The method of recovering sterols from tall oil pitch which comprises treating the tall oil pitch with a dilute aqueous solution of sodium hydroxide in an amount equal to from about 9% to about 12% of the weight of the tall oil pitch to neutralize the free rosin and fatty acids but not enough to saponify the sterol esters therein; separating the sterol esters from the reaction mixture; saponifying the sterol esters with an isopropanolic potassium hydroxide solution comprising at least 20% excess potassium hydroxide with respect to the sterol esters; diluting the saponified sterol ester solution with hot water having a temperature of at least 40° C., but less than the boiling point of the solution, said hot water being added in a water:solution ratio of about 3:1; gradually cooling the diluted solution to room temperature whereby the sterols precipitate out; and separating the precipitated sterols from the cooled diluted solution.

10. The method of recovering sterols from tall oil pitch which comprises treating the tall oil pitch with a dilute aqueous solution of sodium hydroxide in an amount equal to from about 9% to about 12% of the weight of the tall oil pitch to neutralize the free rosin and fatty acids but not enough to saponify the sterol esters therein; adding from about 2 parts to about 7.5 parts of water per part of tall oil pitch whereby a soap layer and a sterol ester layer separate out; removing the sterol ester layer from the reaction mixture; saponifying the sterol esters with an isopropanolic potassium hydroxide solution comprising at least 20% excess potassium hydroxide with respect to the sterol esters; diluting the saponified sterol ester solution with hot water having a temperature of at least 40° C. but less than the boiling point of the solution, said hot water being added in a water:solution ratio of about 3:1; gradually cooling the diluted solution to room temperature whereby the sterols precipitate out; and separating the precipitated sterols from the cooled diluted solution.

References Cited in the file of this patent

UNITED STATES PATENTS

| | | |
|---|---|---|
| 1,912,440 | Frey | June 6, 1933 |
| 2,591,885 | Smith | Apr. 8, 1952 |
| 2,619,495 | Christenson | Nov. 25, 1952 |

FOREIGN PATENTS

| | | |
|---|---|---|
| 547,324 | Great Britain | 1942 |